United States Patent [19]

Bruchez, Jr. et al.

[11] Patent Number: 4,799,623
[45] Date of Patent: Jan. 24, 1989

[54] VARIABLE CONVERGENT/DIVERGENT NOZZLE

[75] Inventors: Raymond J. Bruchez, Jr., Lake Park; Gunther Eichhorn, Palm Beach Gardens; Elliott C. Kiblinger, II, North Palm Beach, all of Fla.

[73] Assignee: United Technologies Corporation, Hartford, Conn.

[21] Appl. No.: 116,930

[22] Filed: Nov. 4, 1987

[51] Int. Cl.⁴ .............................................. F02K 1/08
[52] U.S. Cl. ............................. 239/265.41; 244/75 R
[58] Field of Search ............... 239/265.37, 265.41, 239/265.39; 244/12.5, 23 D, 75 R, 75 A, 213

[56] References Cited

U.S. PATENT DOCUMENTS

| 1,997,285 | 4/1935 | Weymouth | 244/75 A |
| 2,802,333 | 8/1957 | Price et al. | 244/23 D |
| 2,880,575 | 4/1959 | Scialla | 239/265.37 |
| 3,367,579 | 2/1968 | Mehr | 239/265.41 |
| 3,792,815 | 2/1974 | Swavely et al. | 239/265.39 |
| 3,905,241 | 9/1975 | Downing | 244/75 R |

FOREIGN PATENT DOCUMENTS 55254 9/1943 Netherlands .................. 244/75 R

Primary Examiner—Andres Kashnikow
Assistant Examiner—Michael J. Forman
Attorney, Agent, or Firm—Edward L. Kochey, Jr.

[57] ABSTRACT

A variable area convergent divergent nozzle has floating divergent flaps which shift from a low mode to a high mode depending on internal and external pressure. The lost motion connection which permits this is biased to retain the appropriate mode for long term cruise conditions, to reduce ovalization of the nozzle, and to stabilize and/or dampen vibrations.

9 Claims, 2 Drawing Sheet

VARIABLE CONVERGENT/DIVERGENT NOZZLE

The Government has rights in this invention pursuant to a contract awarded by the Department of the Air Force.

TECHNICAL FIELD

The invention relates to convergent/divergent nozzles for supersonic aircraft and in particular to nozzles having floating divergent flaps.

BACKGROUND OF THE INVENTION

Maximum thrust and efficiency of a gas turbine engine is achieved when the exhaust passes through a discharge nozzle which controls expansion and maximizes the discharge velocity. When an aircraft operates at both subsonic and supersonic speeds the exhaust nozzle pressure ratio varies over a substantial range.

Under subsonic flight conditions the pressure ratio is relatively small and a nozzle having substantially a convergent shape is desirable. At supersonic flight conditions when the nozzle pressure ratio is high the appropriate geometry is achieved by a nozzle having a convergent portion followed by a divergent portion. This is referred to as a convergent divergent nozzle.

Many designs have been made which provide variable geometry to effect proper operation at both subsonic and supersonic speeds. For the subsonic condition where only the convergent nozzle is desired, there is only a nominal divergence, this being selected to assure that the throat area remains upstream of the divergent flaps. At supersonic speeds means are supplied to effect the appropriate divergent flow path downstream of the throat. Many of these designs require additional structure and weight to achieve the actuation of the divergent flaps. In an attempt to save the weight and decrease the complexity of the drive mechanism limited range floating divergent flaps have been used. Such a flap is illustrated in U.S. Pat. No. 3,792,815.

The divergent flaps are supported by struts including a lost motion connection. The lost motion connection allows movement between a low mode less divergent position and a high mode more divergent position. An internal/external gas pressure force unbalance establishes the actual location of the flap.

Such a structure works effectively at low speeds and at supersonic speeds. In between there are situations where the flap has not achieved the optimum position for the particular flight condition. If the flight condition is only temporary, this is of little concern. However, should this less than appropriate position occur during a design cruise condition a substantial penalty is paid in loss of efficiency. It would be desirable to avoid operation in this poor efficiency condition.

The pressure existing within the divergent nozzle firmly secures the floating flap in the low mode at low speeds and in the high mode at high supersonic speeds. At intermediate conditions the flap floats between the two extremes. When the pressure increases enough to move the flap away from the low mode position the increased divergence changes the static pressure against the flap so that the flap substantially settles at an equilibrium position between the two extremes. The resulting divergence set by the force balance during this lightly loaded condition can be less than ideal and can result in over expansion, flow separation and a net drag increase (negative thrust). Minor but constant pulsations in the gas flow during this near balance condition can cause a constant flutter of the divergent nozzle elements in this condition, concommitant wear of the linkage, and thrust pulsations. Asymmetric pressure distribution in the nozzle can cause ovalization of the nozzle resulting in varying divergence of the various flaps. This condition varies the performance and durability of floating divergent nozzle designs. When these conditions occur during aircraft cruise, the actual time the nozzle is subject to these conditions is significant.

During various aircraft maneuvers the G-forces and flow field pressures operating on the aircraft cause variation in the position of the divergence elements, which variation should be preferably minimized.

SUMMARY OF THE INVENTION

A variable area CD nozzle has a conventional plurality of convergent flaps which are supported and positioned to achieve appropriate convergent exit area and divergent inlet of the nozzle. A plurality of divergent flaps are pivotally connected to the downstream end of the convergent flaps and positioned by means of a strut pivotally connected to the engine structure. A lost motion connection is associated with this strut so that the flaps may move between a low mode less divergent position and a high mode more divergent position. A spring is located in the lost motion feature biasing the flaps to the low mode position. This spring is illustrated as a cantilevered looped multi-leaf spring. While the spring provides some damping, a damping material between the leaves increases its damping capability.

The spring rate and load is selected of such strength as to maintain the divergent flaps in the preferred mode for the duration of the cruise condition. It, however, permits the flap to move to the high mode for supersonic operation, thereby allowing the setting by design of the float onset and range of the divergent section. In the free floating divergent sections with no springs there can be substantial flutter of the divergent nozzle elements during the long hours of aircraft cruise operation because of the local air pressure variations. Such flutter is virtually eliminated with the spring by maintaining the preferred mode for the engine pressure ratio at cruise which is typically low mode for current engines. By establishing a proportional loading as imposed by the spring, further increases in stability of the flaps at the intermediate conditions is also achieved. The spring damper system furthermore serves to dampen the flutter and according wear is decreased.

The increased restraint imposed by the spring serving to stabilize the flaps decreases the ovalization of the nozzle caused by asymmetric pressure distribution. It furthermore aids in retaining the flaps to their stable position in the event of G-forces.

DESCRIPTION OF THE PREFERRED EMBODIMENT

Figure 1:
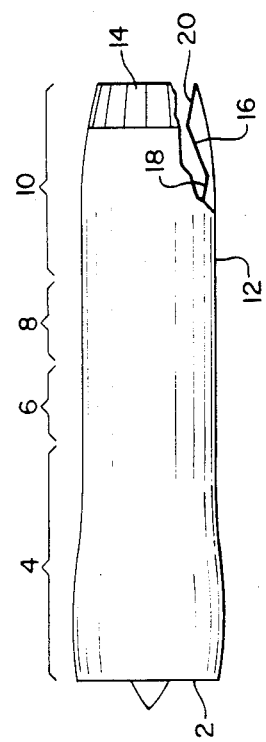
FIG. 1 is a view of a turbo jet engine.

The engine 2 of FIG. 1 includes a conventional compressor section 4, a burner section 6, and a turbine section 8. Also included is an exhaust duct and nozzle section 10 all located within a outer housing structure 12. The nozzle section 10 includes a plurality of optional external flaps 14 located around the outer periphery. The breakaway section in the upper righthand corner of the Figure illustrates a convergent flap 16, a balancing flap 18, and a divergent flap 20.

Figure 2:
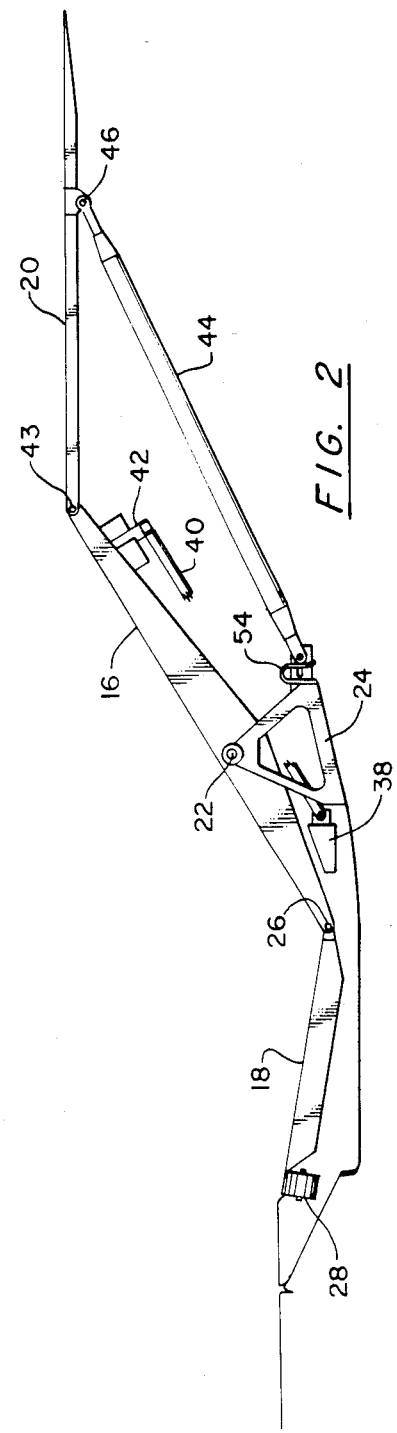
FIG. 2 is a cross section of the convergent/divergent, flap structure.

FIG. 2 illustrates the structure of the internal flap arrangement in more detail. Convergent flap 16 is pivotally mounted at pivot 22 to an A-frame structure 24 which is secured to the engine fixed structure. A plurality of these flaps are circumferentially arranged around the centerline of the engine.

A plurality of the balancing flaps 18 are pivotally connected to the convergent flap at hinge 26 and slidingly connected to the engine structure at support 28. Internal pressure operating on the balance flap 18 cooperates with the pressure operating on the convergent flap 16 to minimize rotational forces thereby reducing the force required by the actuator to locate the convergent flap to form the desired throat area.

An actuator, not shown, operates through unison ring 38 and connecting rod 40 to operate a bellcrank mechanism 42. These surround the plurality of convergent flaps and operate to constrain the diameter thereby effecting the convergence of the flap and establishing a desired throat area.

Figure 3:
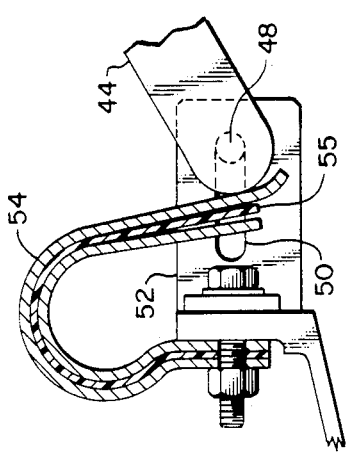
FIG. 3 is a detail of the spring.

Divergent flap 20 is pivotally connected at its upstream end by hinge 43 to the downstream end of the convergent flap 16. Divergent strut 44 is pivotally connected at hinge 46 to the divergent flap. The other end of the strut 44 is pivotally connected to the engine structure as better seen in FIG. 3. At this location the pivot 48 fits within slot 50 of a slotted plate 52. This slot permits movement of the divergent flap between a less divergent low mode position and a more divergent high mode position.

A looped multi-leaf damped spring 54 biases the strut 44 outwardly and thereby biases the divergent flap toward the low mode position. The looped nature of the spring permits a compact high force structure and increased damping by the rubbing of the loops. An intermediate layer or damping means 55 may be contained between the leaves. This may be of a material such as silicone rubber containing fiber mats. Even if the flutter matches the natural frequency of the spring, substantial damping is still accomplished. The multileaf configuration permits appropriate load and travel of the spring without permanent strain of the spring components.

While the lost motion connection and spring 54 are located between lug 52 and the strut, they could be located anyplace between the engine structure and the divergent flap 20. They could be at the other pivot point or located axially in the strut.

Figure 4:
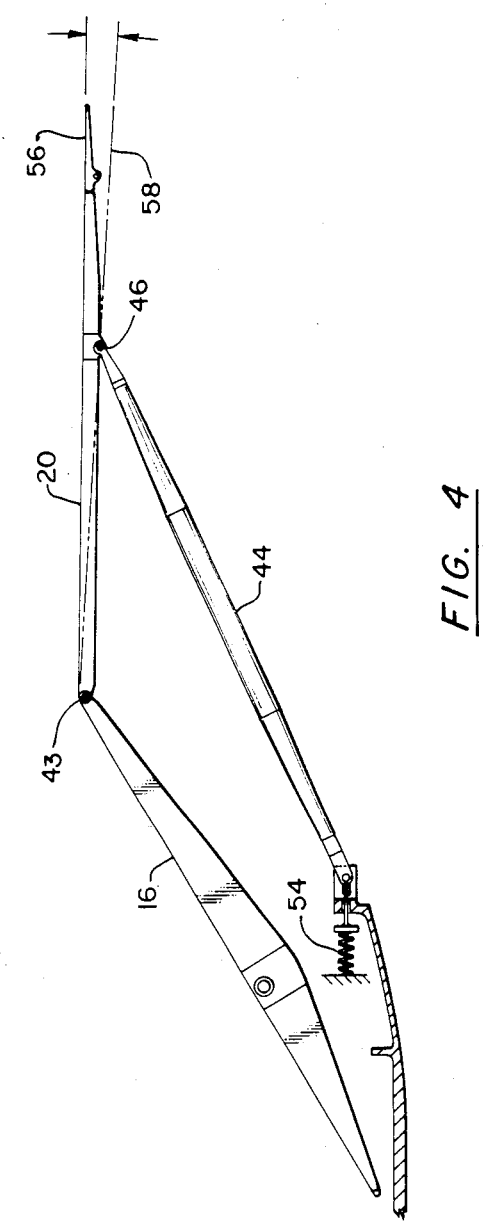
FIG. 4 is a diagram illustrating the high and low mode positions.

FIG. 4 which schematically illustrates the spring 54 illustrates the low mode position 56 shown in solid lines wherein there is only a slight divergence of the nozzle, and the high mode position 58 wherein there is an increased divergence of the nozzle.

The pressures existing along the length of the nozzle vary and are primarily a function of the pressure ratio of the throat pressure in the throat of the nozzle to the ambient pressure of the surrounding atmosphere. For one nozzle design as an example in the absence of the spring the divergent flap remains in the low mode position with pressure ratios below approximately 2.7. It remains in the high mode position at pressure ratios greater than 4. At pressure ratios between 2.7 and 4 the flap floats between the two extremes, and is thereby subject to secondary flow field pressures as the aircraft flys and maneuvers as well as to the resultant "G" forces.

At Mach 0 the pressure ratio is about 2 to 2.5 for normal operating conditions of the engine. At approximately Mach 2 the pressure ratio is in the order of 13 thus clearly maintaining the nozzle flaps in the high mode position.

It is at the desirable cruise speed on the order of 0.9 Mach that less than optimum conditions of divergent nozzle float occurs. Although at cruise power and speed at an elevation of 10,000 feet the pressure ratio is about 2.5 thus providing the desired low mode position, at a preferred cruise altitude of 45,000 feet the pressure ratio increase to about 3.5, thus putting the divergent nozzle in the floating mode. Since this is a desirable long term cruise condition such divergent operation is not desirable, not only because of the floating and concomitant wear on the components, but because it provides less than maximum efficiency at this long term operating condition. The spring 54 is selected to bias the strut 44 so that it remains in the low mode condition for this cruise flight condition. This increases the efficiency and decreases the wear on the components and decreases the ovalization of the nozzle.

There still will be flight conditions where the flaps are not in their optimum position. These conditions, however, can now by design be only those of intermittant operation and where the decrease in efficiency is accordingly not as significant. Even in these conditions, however, the introduction of the proportional load range by the spring will stabilize the flap position and minimize fluctuations and wear.

In the alternate engine designs, the desired cruise and nozzle float characteristics will differ from those described. Accordingly, the amount and direction of the spring bias may vary.

We claim:

1. A variable area convergent divergent nozzle arrangement for a supersonic aircraft having a subsonic cruise condition and a supersonic flight condition comprising:
   engine fixed structure;
   a plurality of convergent flap supports fixed to said engine structure;
   a plurality of upstream convergent flaps circumferentially disposed around the axis of said engine, each pivotally mounted on said convergent flap support;
   positioning means for positioning said convergent flaps to a selected throat area condition;
   a plurality of downstream divergent flaps circumferentially disposed around the axis of said engine, the upstream edge of said divergent flaps pivotally connected to the downstream edge of said convergent flaps;
   a divergent flap strut pivotally connected to each flap and pivotally connected to said engine fixed structure;
   a lost motion connector associated with said strut and located between said divergent flap and said engine fixed structure; and
   a biasing means for biasing lost motion connection toward one end of said lost motion connection in a direction to decrease the divergence of said divergent flaps.

2. A nozzle arrangement as in claim 1:
   said biasing means having a proportional load range whereby the force imposed by said biasing means is proportional to the deflection of said biasing means.

3. A nozzle arrangement as in claim 2:
said biasing means comprising a cantilever spring.

4. A nozzle arrangement as in claim 3:
said biasing means comprising a looped cantilever spring.

5. A nozzle arrangement as in claim 4:
said biasing means comprising a multiple leaf spring.

6. A nozzle arrangement as in claim 4:
damping means contained between the leaves of said multileaf spring.

7. A nozzle arrangement as in claim 1:
said biasing means located between said engine fixed structure and said strut;
and said biasing means being in compression.

8. A nozzle arrangement as in claim 1:
said biasing means selected of a value to maintain said lost motion connection in a position providing the least divergence of said divergent flaps during cruise conditions, and allowing said lost motion connection to move to the position providing maximum divergence of said divergent flaps at supersonic flight conditions.

9. A nozzle arrangement as in claim 1:
additional damping means associated with said biasing means.

* * * * *